(No Model.) 2 Sheets—Sheet 1.
W. PALMER, Jr.
COMBINED SQUARE, BEVEL, PROTRACTOR, AND LEVEL.
No. 383,242. Patented May 22, 1888.
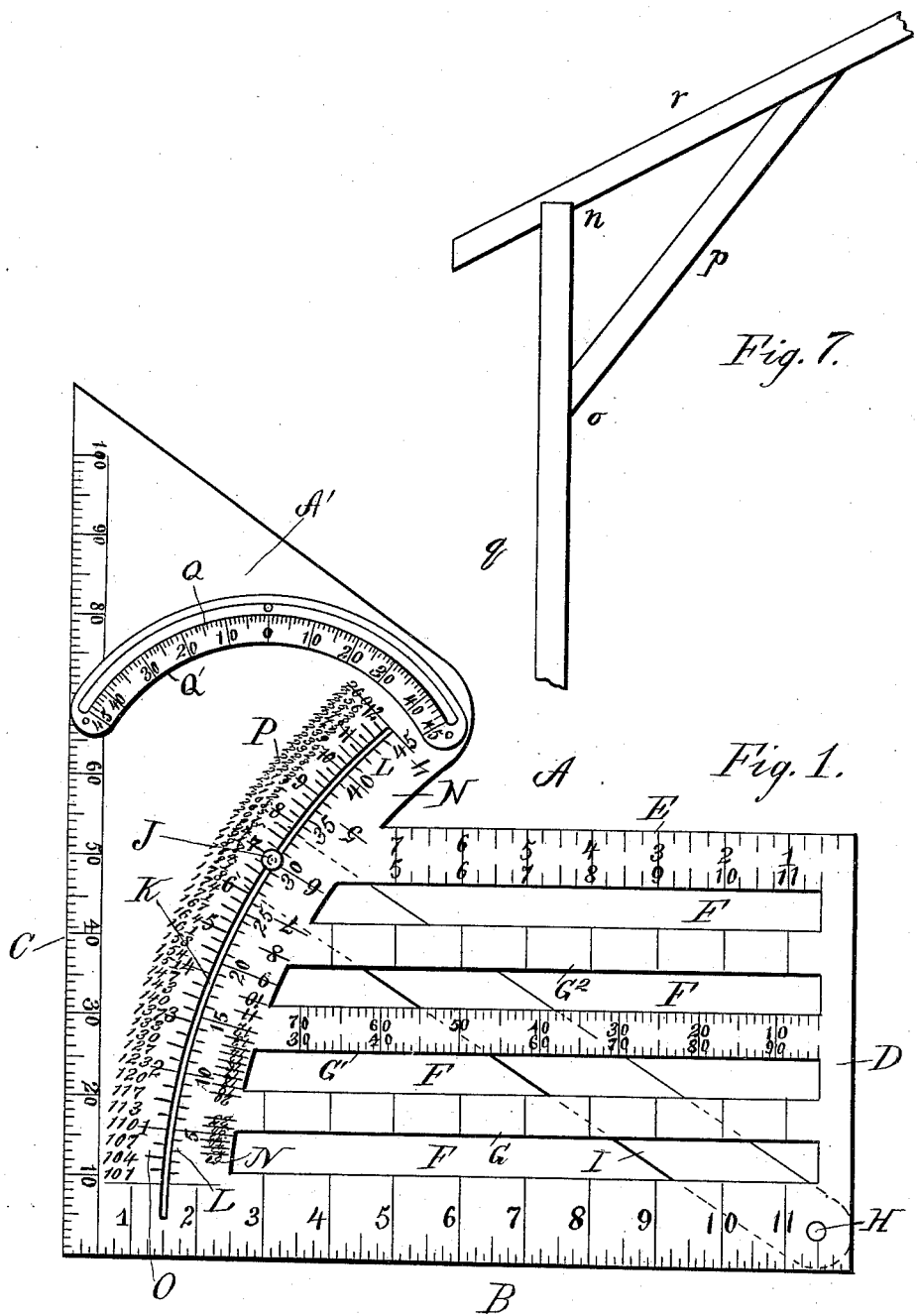
WITNESSES:
Donn Twitchell.
C. Sedgwick.
INVENTOR:
W. Palmer Jr.
BY Munn & Co.
ATTORNEYS.

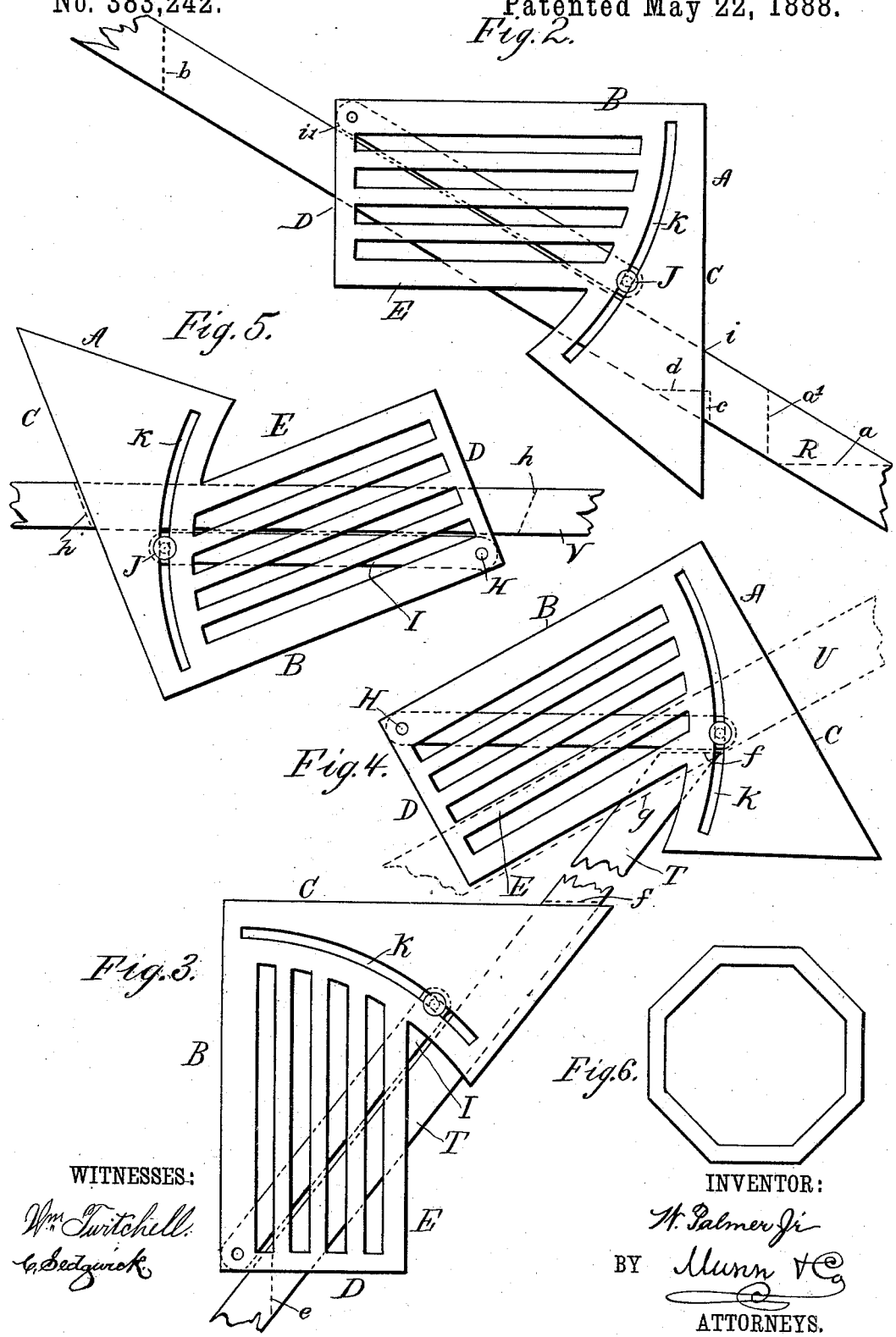

UNITED STATES PATENT OFFICE.

WILLIAM PALMER, JR., OF RINCON, TERRITORY OF NEW MEXICO.

COMBINED SQUARE, BEVEL, PROTRACTOR, AND LEVEL.

SPECIFICATION forming part of Letters Patent No. 383,242, dated May 22, 1888.

Application filed June 21, 1887. Serial No. 242,003. (No model.)

*To all whom it may concern:*

Be it known that I, WILLIAM PALMER, Jr., of Rincon, in the county of Donna Ana and Territory of New Mexico, have invented a new and Improved Combination Bevel-Square, of which the following is a full, clear, and exact description.

The object of my invention is to provide a new and improved instrument for measuring the lengths of rafters and braces, for marking bevels at the ends of the rafters and braces, and for forming polygonal figures.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 represents a face view of my improvement. Figs. 2, 3, 4, and 5 represent views showing how my instrument is applied. Fig. 6 is a front view of an octagonal figure laid out with the edge of my improved instrument, and Fig. 7 is an end elevation of part of the frame-work of a house.

The instrument is provided with a blade, A, preferably of sheet metal, and having the edge B provided with a scale representing inches and subdivisions thereof. One end of the edge B is at right angles to the edge C, which is provided with a scale, and the other end of the edge B is at right angles to the edge D, which is at right angles to the graduated edge E, parallel with the graduated edge B. The blade A is also provided with a series of slots, F, which form a number of bars, G, G', and G², parallel with the edges E and B, and provided with graduations, of which the graduations on the bars G and G² correspond to the graduations of the edges B and E, while the graduation on the bar G' represents a scale for laying out braces, as hereinafter more fully described.

On the under side of the blade A is pivoted at H one end of a straight-edge, I, provided on its other end with a set-screw, J, the shank of which passes through a segmental slot, K, formed in the blade A. On one side of the slot K is formed, on the blade A, the scale L, representing degrees and subdivisions of the same, and next to this scale L is formed the scale N for laying out polygonal figures. On the other side of the slot K is formed on the blade A the scale O, representing inches and subdivisions of the same, indicating the pitch of rafters and braces, and corresponding with the degree-scale L. Next to the scale O is formed a scale, P, which gives the length of braces, having an angle of thirty-three and one-third degrees. On the part A' of the plate A is arranged the segmental lever Q, provided with a graduation, Q', representing degrees and subdivisions and intended to indicate the angle of rafters and braces.

The instrument is used as follows: In order to mark the bevel on the lower end of a rafter, I set the upper edge of the straight-edge I to the respective angle of the rafter indicated on the scale L or to the corresponding pitch-scale O, and the instrument is then placed upon the rafter R, as shown in Fig. 2, so that the straight-edge I rests on the side of the rafter and the blade A is on top of the rafter. The instrument is then moved to the lower end of the rafter, and the line *a* is drawn across the rafter on the edge E of the blade A or along a bar, G. This line indicates the bevel of the lower end of the rafter. The length of the rafter is then measured by measuring the length across the blade A on the line indicated by the upper edge of the straight-edge between the edges C and D of the blade A—that is, as shown in Fig. 2, from the point *i* to the point *i'*. This length *i* to *i'* is measured on the rafter as many times as there are feet contained in half of the width of the building, and if any inches are left over then a line is drawn along the edge D, and the instrument is then slid forward until the edge D extends to the next number of inches from the said drawn line measured on the scale on the edge E, or on any of the parallel bars G. A line drawn then along the edge D indicates the upper bevel of the rafter, and also the length of the rafter. If the lower end of the rafter is to project beyond the side of the building, then the lower end is marked by the line $a'$ along the edges C or D, and the instrument is moved upward on the rafter to the point where the rafter is to join the upper edge of the side of the building, and the line $c$ is drawn across the rafter on the edge C of the instrument. The depth of the intended notch is measured on this line $c$ by the edge of the scale B, and the instrument is then moved until the edge E or one of the cross-bars G intersects the inner end of the line $c$. The line $d$ is then drawn on the rafter along the said edge E of the instrument. The lines $c$ and $d$ indicate the points of junction of the rafter with the upper edge of the side of the building. The upper bevel of the rafter is then formed as described.

To mark the bevels or braces T, (see Fig. 3,) I set the instrument to the intended angle of the brace by adjusting the straight-edge I to the respective angle on the scale L or to the pitch-scale O. The instrument is then placed on the lower end of the brace T, and the lower bevel is marked by drawing the line $e$ across the brace T on the edge E of the blade A. When the upper end of the brace T is to join a horizontal beam, then the line $f$ is drawn across the upper end of the brace on the edge D or C of the instrument, and when the upper end of the brace T is to join a rafter, U, (shown in dotted lines in Fig. 4,) then the line $f$ is marked on the upper end of the brace T, as before described, and the straight-edge I is then set to the angle of the rafter U, and the instrument is placed upon the brace with the straight-edge I on the marked line $f$. A second line, $g$, is then drawn across the brace T along the edge E, or on any of the bars G, as shown in the upper part of Fig. 3. This line $g$ indicates the bevel of the brace at its junction with the rafter.

When a polygonal figure is to be formed by boards of equal length, the straight-edge I is adjusted to the blade A on the polygonal scale N, so as to indicate the respective number of sides of the polygon. For instance, if an octagonal figure, as shown in Fig. 6, is to be formed, then the straight edge I is fastened to the blade A on Fig. 8 of the scale N. The instrument is then applied as shown in Fig. 5, and the ends of each of the boards V are then marked by the line $h$, drawn on the said board along the edge D or C of the instrument. The lines $h$ indicate the correct bevels for joining the several boards V together to form the polygonal figure shown in Fig. 5.

The length of a brace, $p$, having an inclination of thirty-three and one-third degrees is found on the scale P by measuring on the upright $q$ from the point $n$ to the point $o$, and keeping account of the number of tenths of a foot. The straight-edge I is then set to the pitch of the roof $r$ on the scale O, (which is ten inches per foot,) and then multiply the numeral indicated by the straight-edge on the scale P by the number of tenths of a foot measured along the upright $q$ of the point $n$ to the point $o$. The product will be the number of feet and hundredths of feet of the brace $p$. The straight-edge I is then set to the angle of the brace, and the above product is measured out on the brace.

The scale on the bar G' is specially adapted for laying out the product on the brace $p$.

The level Q is intended for finding the angles of rafters and braces, and is used as follows: The edge B or C is placed on the rafter, and the bubble in the level Q will then indicate on the scale Q' the degrees and subdivisions of the desired angle of the rafter or brace.

To find the length of a brace between an upright post and a horizontal beam is to measure from the top of the post down to the bottom of the brace, as shown in Fig. 7. Then set the straight-edge to any angle desired, and lay out across the machine as many feet and inches as there are between the points just named. The bevels are marked as described.

Having thus described my invention, what I claim as new, and desire to secure by Letters Patent, is—

1. A measuring-instrument formed of a single approximately L-shaped plate, A, having the integral parallel bars G G' G² in one arm and the curved slot K in its other arm, and the straight-edge I, pivoted at H to the plate, and having a set-screw, J, extending through the curved slot, substantially as described.

2. A measuring-instrument consisting in the approximately L-shaped plate A, having integral parallel bars G G' G² in one arm, the curved slot K in the other arm, the segmental level Q, extending across the arm of the plate above or beyond the slot K, and the straight-edge I, pivoted at H to the plate, and having a set-screw, J, passing through the slot to hold the straight-edge at the desired angle across the bars, substantially as set forth.

3. In a measuring-instrument, the blade A, provided with the scale L, indicating degrees, and the edges D and C, the graduated edge E, and the graduated parallel bars G, all formed on the said blade, in combination with the straight-edge I, pivoted on the said blade and held adjustably on the same, substantially as shown and described.

4. In a measuring-instrument, the blade A, provided with the scale P, indicating the length of braces, and the graduated bar G' for measuring the length of the brace, in combination with the straight-edge I, pivoted on the said blade, substantially as shown and described.

5. In a measuring-instrument, the plate A, approximately of L shape, and having the graduated outer edges, B C, at right angles one to the other, and the curved level Q, extending transversely across the upper end of the arm A' of said L-shaped plate, substantially as set forth.

6. In a measuring-instrument, the blade A, provided with the edges B, C, D, and E, the bars G, parallel with the said edges E and B, and the scales L, N, and O, formed on the said blade A, in combination with the straight-edge I, pivoted on the said blade A, and the set-screw J, the shank of which passes through a segmental slot, K, formed in the blade A, the said set-screw serving to fasten the said straight-edge I upon the said blade, substantially as shown and described.

WM. PALMER, JR.

Witnesses:
ACHESON MCCLINTOCK,
D. A. SHOPE.